(12) United States Patent
Yamazaki

(10) Patent No.: US 6,532,116 B1
(45) Date of Patent: Mar. 11, 2003

(54) COMPACT OPTICAL APPARATUS FOR HEAD UP DISPLAY

(75) Inventor: Shoichi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/713,232

(22) Filed: Nov. 16, 2000

Related U.S. Application Data

(62) Division of application No. 08/879,966, filed on Jun. 20, 1997, which is a continuation of application No. 08/317,528, filed on Oct. 4, 1994.

(30) Foreign Application Priority Data

Oct. 5, 1993 (JP) ............................................. 5-249417

(51) Int. Cl.[7] .......................... G02B 17/00; G02B 27/10
(52) U.S. Cl. ........................ 359/728; 359/631; 359/633
(58) Field of Search ................................ 359/728, 630, 359/631, 632, 633

(56) References Cited

U.S. PATENT DOCUMENTS

| | | | |
|---|---|---|---|
| 3,940,204 A | 2/1976 | Withrington | 350/3.5 |
| 4,026,641 A | 5/1977 | Bosserman et al. | 350/298 |
| 4,081,209 A | 3/1978 | Heller et al. | 350/174 |
| 4,322,135 A | 3/1982 | Freeman | 350/410 |
| 4,669,810 A | 6/1987 | Wood | 350/3.7 |
| 4,854,688 A | 8/1989 | Hayford et al. | 350/571 |
| 4,859,030 A | 8/1989 | Rotier | 350/174 |
| 4,969,724 A | 11/1990 | Ellis | 350/503 |
| 5,000,544 A | 3/1991 | Staveley | 350/174 |
| 5,006,072 A | 4/1991 | Letovsky et al. | 434/61 |
| 5,093,567 A | 3/1992 | Staveley | 250/221 |
| 5,384,654 A | 1/1995 | Iba | 359/364 |
| 5,430,634 A | 7/1995 | Baker et al. | 362/32 |
| 5,436,763 A | 7/1995 | Chen et al. | 359/565 |
| 5,436,765 A | 7/1995 | Togino | 359/631 |
| 5,479,224 A | 12/1995 | Yasugaki et al. | 353/101 |
| 5,513,041 A | 4/1996 | Togino | 359/631 |
| 5,517,366 A | 5/1996 | Togino | 359/850 |
| 5,539,578 A | 7/1996 | Togino et al. | 359/850 |
| 5,546,227 A | 8/1996 | Yasugaki et al. | 359/630 |
| 5,640,275 A | 6/1997 | Bourguignat et al. | 359/630 |
| 5,646,783 A | 7/1997 | Banbury | 359/630 |
| 5,726,807 A | 3/1998 | Nakaoka et al. | 359/631 |
| 5,836,667 A | 11/1998 | Baker et al. | 362/32 |
| RE37,667 E | * 4/2002 | Togino et al. | 359/631 |

FOREIGN PATENT DOCUMENTS

| | | |
|---|---|---|
| EP | 0 408 344 | 1/1991 |
| JP | 62-214782 | 9/1987 |
| JP | 3-101709 | 4/1991 |
| JP | 5-323229 | 12/1993 |
| JP | 6-43389 | 2/1994 |

OTHER PUBLICATIONS

Partial Translation and Abstract for Japanese Laid–Open Patent Application No. 62–214782.
Abstracts for Japanese Laid–Open Patent Application No. 5–323229.

* cited by examiner

Primary Examiner—Scott J. Sugarman
(74) Attorney, Agent, or Firm—Fitzpatrick, Cella, Harper & Scinto

(57) ABSTRACT

A head up display apparatus adapted to be mounted on a user's head in a goggle type or head gear type arrangement and enable a video image to be observed, wherein an original image is directed to an eyeball through a reflecting optical system to enable the image to be observed, and one or more members differing in power depending on the azimuth direction are present in the reflecting optical system. The members are designed to have an aspherical surface action in the cross-section of at least one azimuth direction.

4 Claims, 6 Drawing Sheets

COMPACT OPTICAL APPARATUS FOR HEAD UP DISPLAY

This application is a division of application Ser. No. 08/879,966 filed Jun. 20, 1997, which is a continuation of application Ser. No. 08/317,528 filed Oct. 4, 1994, now abandoned.

BACKGROUND OF THE INVENTION

1. Field of the Invention

This invention relates to a display of a type such as a spectacle type, a goggle type or a helmet type which is mounted on a user.

2. Related Background Art

There are many U.S. patents for head up displays, and many of them relate to helmets for an aircraft. A first type is a primary imaging type as disclosed in U.S. Pat. No. 3,940,204 wherein the image of a CRT or the like is once formed through a lens system. A second type is a virtual image type as disclosed in U.S. Pat. No. 4,026,641 wherein light from an image is not imaged but is directed to an eyeball to thereby form a virtual image. Also, this patent somewhat strengthens the power of the reflecting mirror of a reflecting optical system, eliminates a convex lens usually disposed just in front of an eyeball for enlarging an image, and further sets the reflecting mirror and a CRT so that the screen of the CRT may be inclined toward a man's head, thereby making the apparatus compact. A third type is a prism type as disclosed in U.S. Pat. No. 4,969,724 wherein a prism is utilized to make a reflecting optical system compact. Also, there is U.S. Pat. No. 4,859,030 as a primary imaging type which utilizes a prism, and there is U.S. Pat. No. 4,081,209 as a virtual image type which utilizes a prism.

Now, where a compact and lightweight structure like a goggle type display is sought after, the aforedescribed primary imaging type is good in optical performance, but requires a number of lenses, which leads to bulkiness, and the prism type is compact but becomes heavy. Accordingly, the virtual image type is preferable in respect of compactness and light weight, but is not very good in optical performance. In this point, the aforementioned U.S. Pat. No. 4,026,641 obtains a good optical performance with the reflecting surface of the reflecting optical system as a toric surface and with an original image surface itself as a toric surface. However, to convert the flat image surface of a CRT or the like into a toric surface, it is necessary to use a bundle of glass fibers and the like and this is technically difficult and requires a high cost. Also, in the embodiment shown in this patent, the distance IP from the last surface to the eye point is equal to or greater than 60 mm, and this is a cause which hampers compactness.

In the present invention, as shown in FIG. 2 of the accompanying drawings which will be described later, the point at which the central light beam of the maximum image height light beam in the direction of the longer side of an image intersects the optical axis of an eye is defined as the eye point. Also, the distance from the last effective surface on the optical axis of the eye to the eye point is IP. The last effective surface does not include the glass or the like of a dustproof window.

SUMMARY OF THE INVENTION

It is an object of the present invention to provide a display apparatus which can be made compact and light in weight to such a degree as to be mountable on a head and yet is good in image performance.

Further objects of the present invention will become apparent from the following detailed description.

DESCRIPTION OF THE PREFERRED EMBODIMENTS

The display apparatus according to the present invention is an apparatus in which observation or the like is made possible by optically relating a fiducial surface with an observer's eye through a reflecting optical system and wherein one or more members differing in power from an azimuth are present in the reflecting optical system, said members being designed to have an aspherical surface action in the cross-section in at least one azimuth direction.

Saying in addition, this apparatus generally makes an original image as a flat fiducial surface into a virtual image through the reflecting optical system, and a reflecting surface therein has power, and a positive lens for enlarging the image need not be provided just in front of an eye. On the other hand, saying from another point of view, in an apparatus wherein an original image is directed to an eyeball through a reflecting optical system to thereby enable the image to be observed, one or more members differing in power depending on the direction of an azimuth are provided in the reflecting optical system and the original image is formed such that an image obtained through the reflecting optical system may not be distorted. Further, it is desirable to consider the following construction.

Of the central light beam of an image directed to an eye, setting the angle formed between the central ray incident on a reflecting member just in front of the eyeball and the emergent ray therefrom to an angle being desirably 10° or greater than 10° and 80° or less than 80° is effective to bring a cathode ray tube (CRT) or a liquid crystal display (LCD) providing the original image close to a man's head and make the apparatus compact.

$$10° \leq \theta \leq 80° \tag{1}$$

Figure 1:
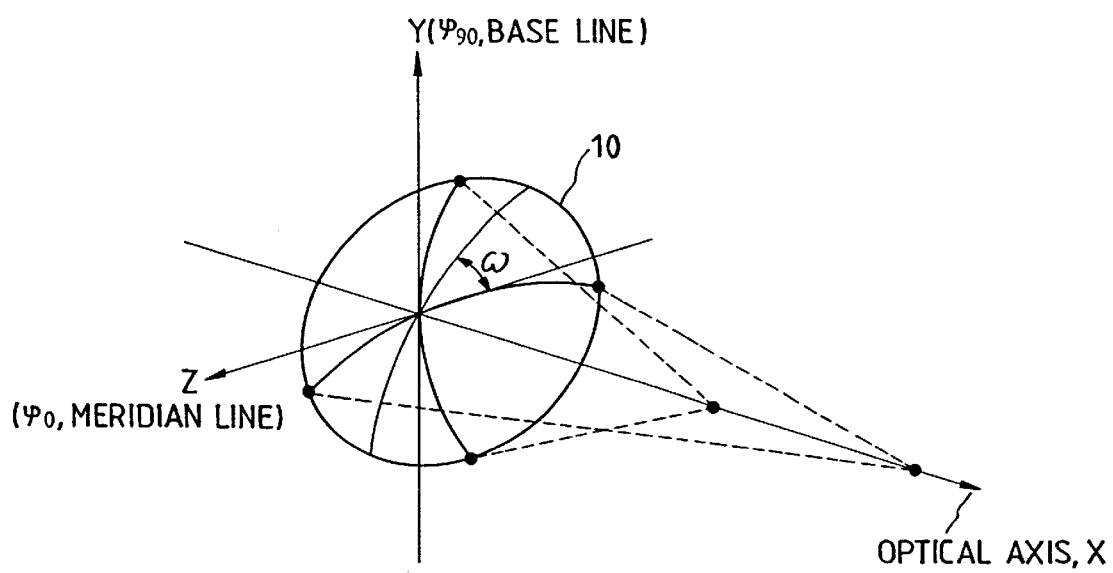
FIG. 1 is a perspective view for illustrating a toric reflecting surface.

At this time, the reflecting mirror has power and therefore the greater θ becomes, the more are created eccentric aberrations (especially eccentric astigmatism and eccentric curvature of image field). In order to make these eccentric aberrations small, a member differing in power depending on the azimuth direction like a toric surface is used as a reflecting surface. FIG. 1 is an illustration of a toric surface, and the radius of curvature thereof differs depending on the azimuth angle ω ($0 \leq \omega \leq 180°$).

Also, in the case of a compact goggle type display, the distance IP between the last optical surface and the eye point will be sufficient even for a person wearing a pair of spectacles if it is 50 mm. So, when the distance IP is set to 50 mm or less, not only the apparatus can be made compact, but also the creation of the aforementioned eccentric aberrations can be reduced because as disclosed in U.S. Pat. No. 4,026,641, in a reflecting mirror, the off-axis light beam is considerably reflected near the marginal portion of the mirror as compared with the central light beam, whereas the off-axis light beam is considerably reflected near the center of the reflecting mirror.

It is preferable to satisfy the following condition:

$$5 \text{ mm} \leq IP \leq 50 \text{ mm} \qquad (2)$$

Figure 7:
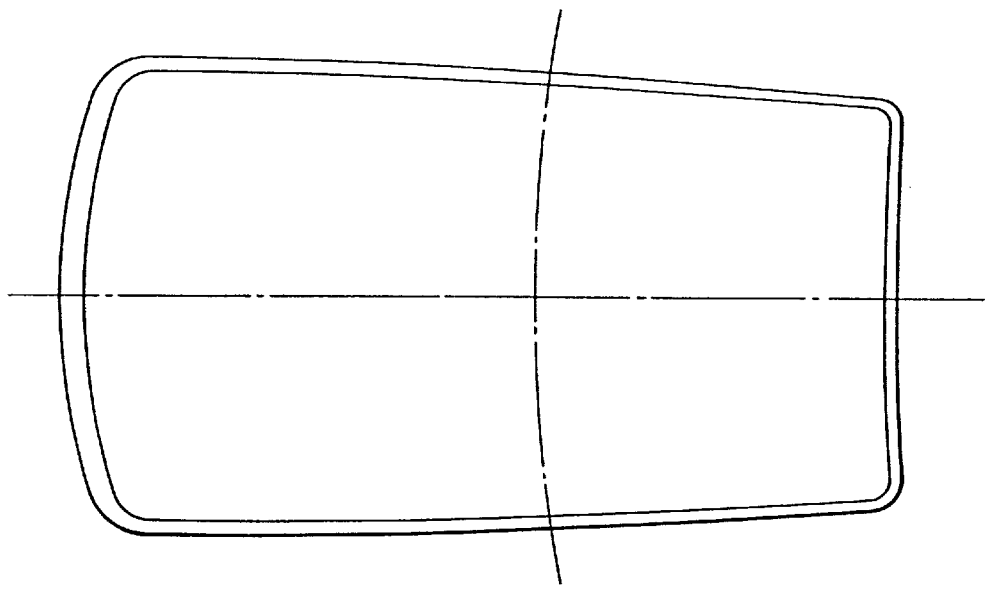
FIG. 7 shows an original image.
Figure 8:
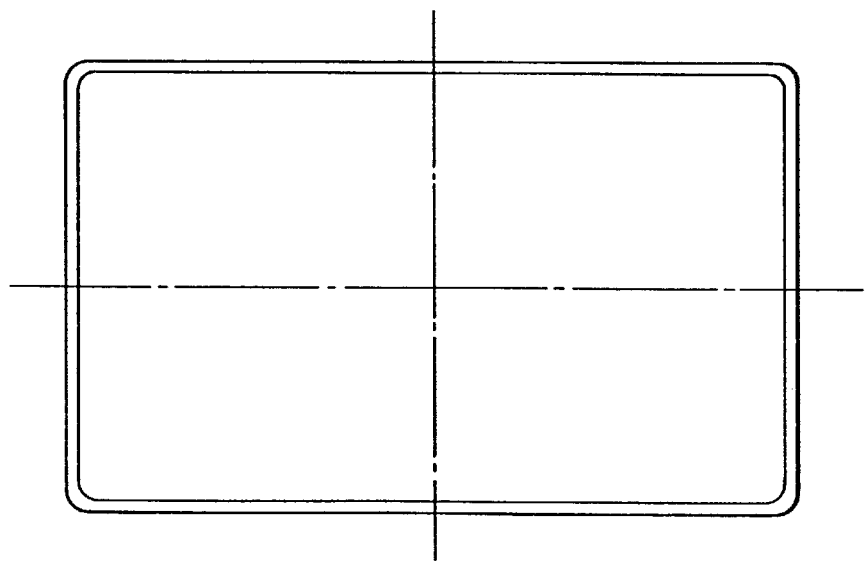
FIG. 8 shows an observed image.

Also, the original image is corrected into a shape as shown in FIG. 7 so as to cancel eccentric distortion created in the reflecting optical system on the image and therefore, the eccentric distortion can be freed in the reflecting optical system. Thus, the number of lenses in the reflecting optical system can be reduced to make the apparatus compact, and even when the image of a plane is enlargedly projected to form a virtual image, distortion and various aberrations can be made small. Further, the reflecting mirror is given an aspherical surface action in the cross-section of at least one azimuth direction, whereby it is made possible to reduce the aforementioned eccentric aberrations. FIG. 8 shows the shape of a screen which is observed. As regards the shape shown in FIG. 7, there can be adopted a method of manufacturing the liquid crystal display with pixels arranged so that the display surface itself thereof may display this shape, or a method of applying a video signal to electrical processing to thereby give distortion to the video signal.

As described above, the distance IP from the last optical surface of the optical system to the eye point is set to a rather short distance and a toric aspherical surface (a surface made aspherical with a toric surface as a basic surface) is adopted for the image correction from the original image and therefore, a conversion element like a bundle of glass fibers and the like need not be used and even if a flat original image is projected, a good performance could be obtained.

Regarding the meanings of the external values of the above-mentioned conditional expressions, if the lower limit of conditional expression (1) becomes smaller than 10°, the power (LCD and CRT) of the original image will strike against a man's face unless the value of the distance IP is made considerably great, and thus the apparatus will become bulky. Also, if the upper limit of conditional expression (1) is exceeded, the creation of eccentric aberrations will be too great, and an attempt to correct it would make the apparatus bulky.

Also, if the lower limit of conditional expression (2) is exceeded, the image will become unseen when the eye is placed at an ordinary observation position (IP=20 mm). The upper limit of conditional expression (2) is as previously described. On the other hand, when the power in the azimuth direction when the original image, the reflecting member and the eyeball are optically in the same plane with respect to the reflecting member just in front of the eyeball is $\phi 0$ and the power in an azimuth direction in a plane perpendicular to that plane is $\phi 90$, it is desirable to satisfy the following condition:

$$0.3 < \phi 0/\phi 90 < 1.2 \qquad (3)$$

However, the power is the inverse number of the focal length. The meaning of the lower limit value of conditional expression (3) is that if this value is exceeded, $\phi 90$ will become great and the ray of light in the azimuth direction of $\phi 90$ will become under and minus diopter will become too strong. If conversely, the upper limit of conditional expression (3) is exceeded, $\phi 0$ will become great and eccentric coma created in the ray of light in the azimuth direction of $\phi 0$ will become great.

Further, it is preferable to provide a field lens between the original image and the reflecting member, and this is useful to make the image small. Particularly, adopting a toric aspherical surface as the refracting surface of the field lens is effective to improve the optical performance, and especially leads to the possibility of making astigmatic difference small.

The present embodiment which will be described later is a reflecting optical system independent for the left eye and for the right eye. U.S. Pat. Nos. 5,006,072, 5,000,544, etc. disclose a reflecting optical system of a type in common for the left and right eyes in which a reflecting surface in common for the left eye and right eye is defined and an image is formed. A common reflecting surface means that there is only one surface vertex of the reflecting surface. As is well known, when light is transmitted through or reflected by a portion far from the surface vertex, high-order aberrations are greatly created. Accordingly, when both of the optical path for the left eye and the optical path for the right eye use a reflecting curved surface having a single surface vertex, a light beam must be reflected by a portion considerably far from the surface vertex in both optical paths, and the creation of high-order aberrations is great. Therefore, the angle of field of the image becomes small, or the apparatus is liable to become bulky.

So, the present embodiment is a reflecting optical system independent for the left eye and for the right eye, and the member in the reflecting optical system has surface vertices independent on each other for the left eye and for the right eye. By doing so, the portion near the surface vertices is used as an optical path, and it is possible to suppress high-order aberrations and achieve a compact image of a high angle of field. Also, even if members for the left eye and for the right eye are connected together to make a single member, it has a surface vertex independent for the left eye and for the right eye without fail. This also holds true when it is used for a single eye.

A toric reflecting surface relating to the present embodiment will now be described with reference to FIG. 1.

The reference numeral 10 designates a toric concave reflecting surface. The X-axis is an optical axis, and the meridian line is in X-Z plane and it is $\phi 0$ direction, and the base line (generatrix) is in X-Y plane and it is $\phi 90$ direction. Also, when the meridian line is an aspherical surface, the definition expression of the aspherical surface which is the meridian line is $$X = \frac{Z^2/r}{1 + \sqrt{1 - (K+1)(Z/r)^2}} + BZ^4 + CZ^6 + DZ^8 \qquad (4)$$

where r: the paraxial radius of curvature in the $\phi 0$ and meridian line directions (cross-sectional view).

As examples of aspherical surface coefficients B and C.

$$-1.0 < B < 1.0 \qquad (a)$$

$$-1.0 < C < 1.0 \qquad (b)$$

That is, neither of B and C is 0. If the lower limits of expressions (a) and (b) are exceeded, the aspherical surface action will become too strong as a negative lens, and if the upper limits of expressions (a) and (b) are exceeded, the aspherical surface action of a positive lens will become too strong. Also, regarding the aspherical shape of the vicinity of the surface vertex, it is made into an aspherical shape in a direction to further strengthen the power on the surface vertex as it becomes farther from the surface 4 vertex, whereby eccentric coma created in the reflecting optical system can be made good.

Figure 2:
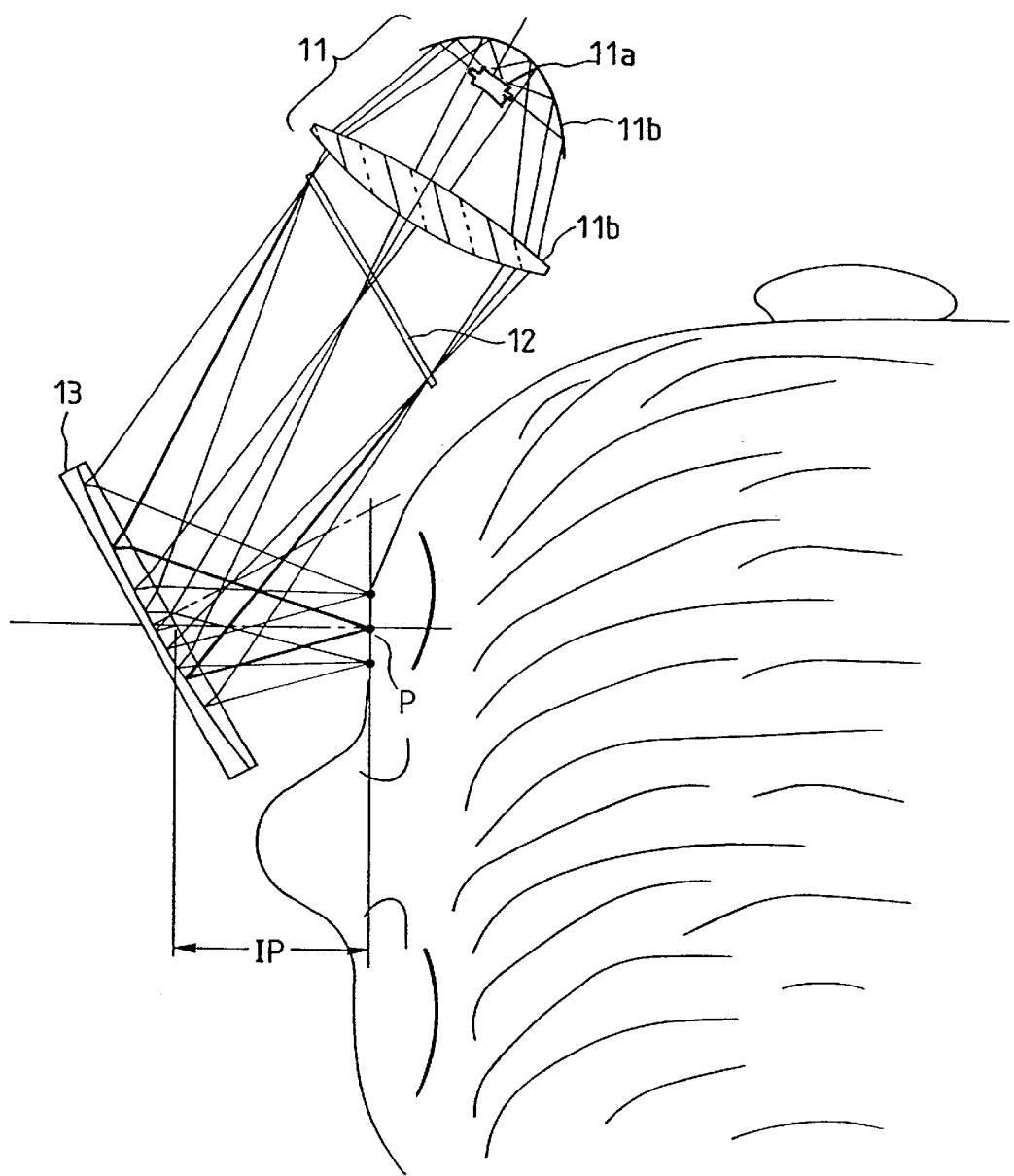
FIG. 2 is a plan view showing the arrangement of an embodiment of the present invention.

FIG. 2 diagrammatically depicts the member of a goggle type display apparatus for the right eye from above it. Although a member for mounting the apparatus on a head is not shown, it may be of a band type, a spectacle bow type or a head gear type. The member for the left eye is of a substantially symmetrical construction. The present embodiment is designed to project an original image of 1 inch onto a point 1 m ahead (−1 diopter) and look at it as the image (virtual image) of a large screen of the order of 29 inches, and the angle of field corresponds to that of a lens having a focal length of about 50 mm.

In FIG. 2, the reference numeral 11 denotes an illuminating unit comprising a light source 11a, a parabolic surface mirror 11b and a condenser lens 11b. The reference numeral 12 designates a liquid crystal display for providing an original image. The liquid crystal display 12 is illuminated from its back by the illuminating unit 11. However, where a small cathode ray tube is employed in lieu of the liquid crystal display 12, the illuminating unit is unnecessary.

The reference numeral 13 denotes a reflecting member which will be described later in detail. The reflecting member 13 is provided with a toric concave reflecting surface therein. The letter P designates an observer's eye point, and IP is the distance between the last surface of the reflecting member and the eye point on the optical axis of an eyeball seeing infinity.

The reflecting surface of the reflecting member 13 uses a toric aspherical surface, but it is preferable to give the above-mentioned aspherical surface to the cross-section in the azimuth direction when the original image, the reflecting member and the eyeball are in the same plane. The reason for this is that the creation of aberrations, particularly, eccentric aberrations, is greater in the azimuth direction (the direction φ0) than in an azimuth direction (the direction φ90) orthogonal to said azimuth direction.

Numerical value data will hereinafter be described with respect to embodiments described in tables which will be shown later.

Figure 3:
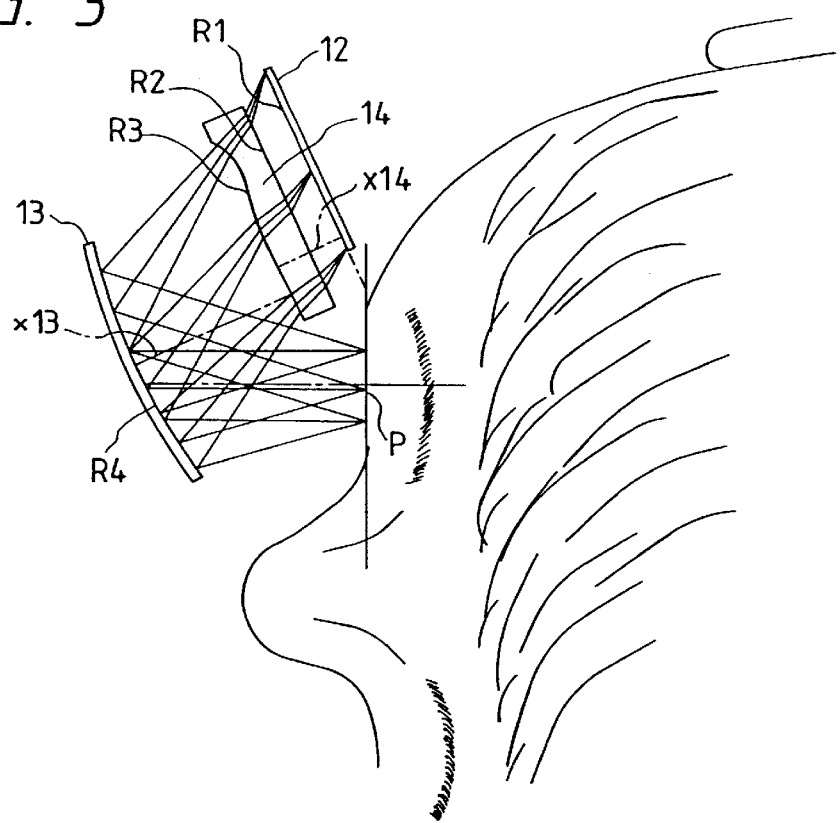
FIG. 3 is a plan view showing Embodiment 2 of the present invention.

In these examples, various methods are used to control eccentric aberrations. FIG. 3 corresponds to Table 1, FIG. 4 corresponds to Table 2, FIG. 5 corresponds to Table 3, and FIGS. 6A to 6C correspond to Table 4. Also, FIGS. 3, 4 and 6A to 6C show a type in which the original image is disposed sideways of the cheek, and FIG. 5 shows a type in which the original image is disposed forwardly of the brow.

In FIG. 3, the reflecting member 13 provided with a toric reflecting surface or a toric reflecting aspherical surface and a field lens 14 provided with a toric lens surface or a toric aspherical surface adjacent to the display 12 are made parallel-eccentric on the cross-sectional view (φ0 direction). The reference character x13 denotes the optical axis of the concave reflecting member 13, and x14 designates the optical axis of the field lens 14. Further, the field lens 14 and the original image surface 12 can be tilted to thereby make eccentric aberrations small. The reflecting surface comprises a half mirror or the like and accomplishes both reflection and transmission.

Figure 5:
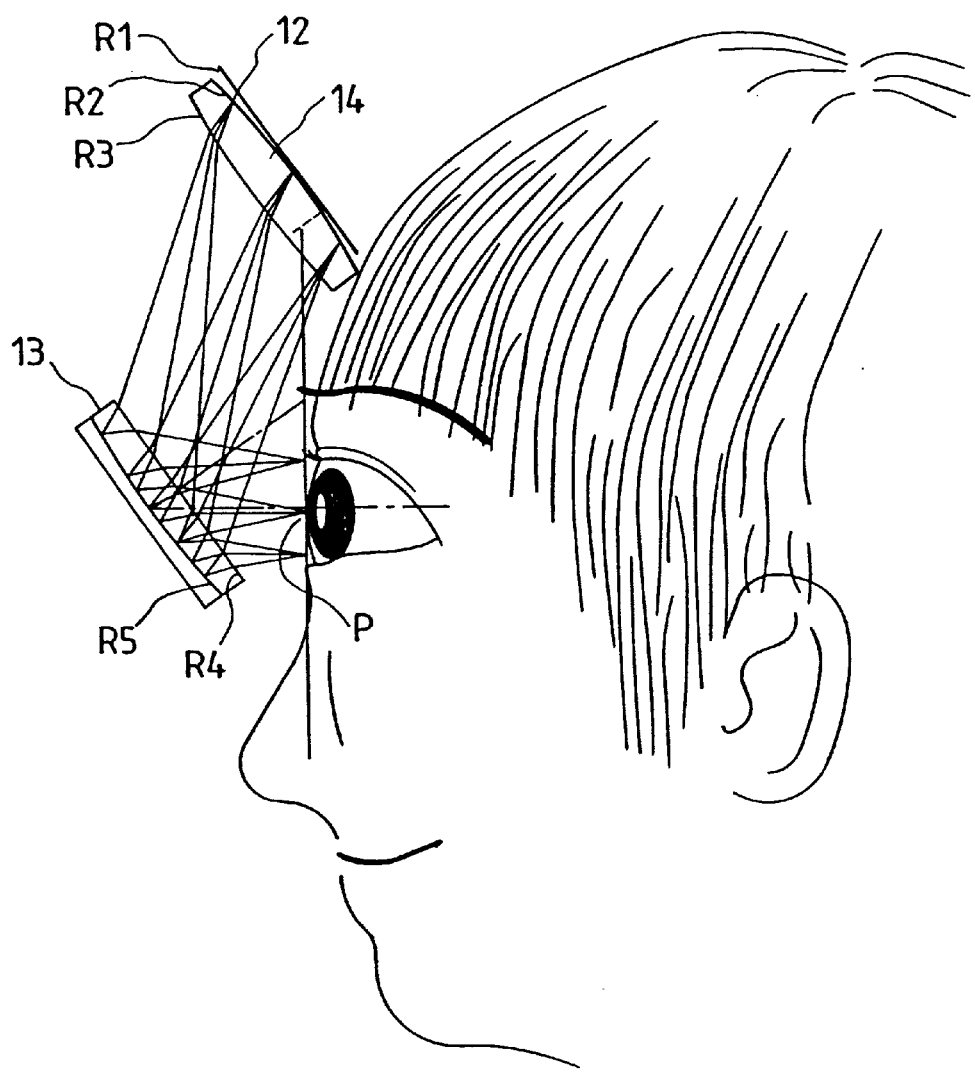
FIG. 5 is an elevational view showing Embodiment 4 of the present invention.

FIG. 5 also shows an example in which provision is made of a field lens 14 made parallel-eccentric. The reflecting member 13 is a plane parallel plate in its appearance, and is inclined by 35° with respect to the optical axis of the eyeball, and the intermediate surface R5 thereof is a toric reflecting surface or a toric reflecting aspherical surface, and is sandwiched between two sheets of glass.

Figure 6A:
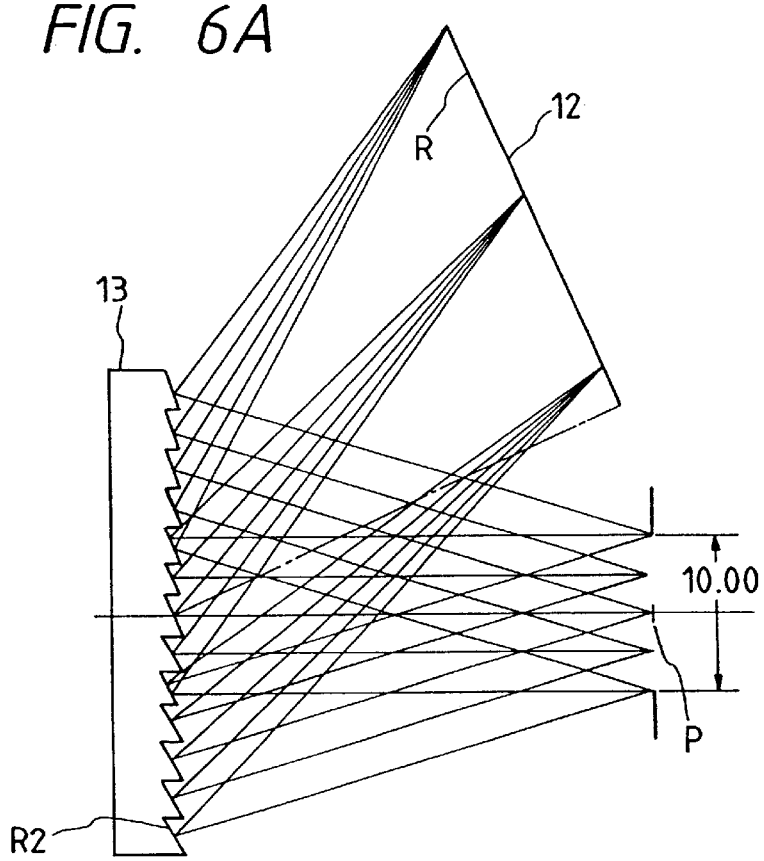
FIGS. 6A, 6B and 6C are plan views showing Embodiment 5 of the present invention.
Figure 6B:
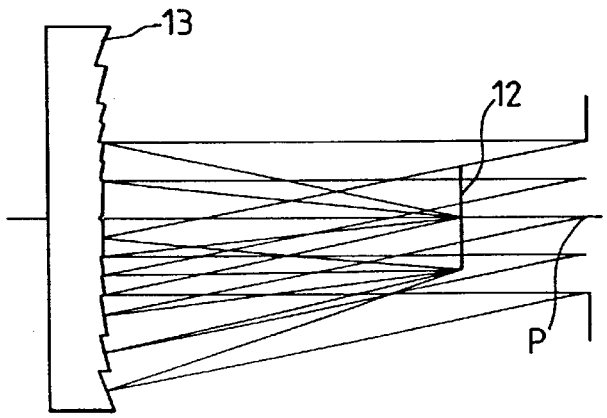
Figure 6C:
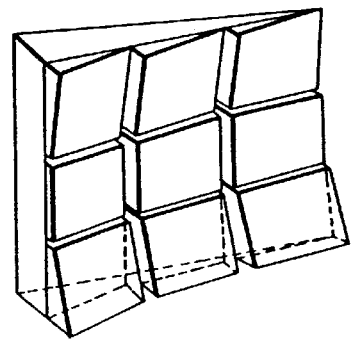

FIG. 6A shows the form of the present embodiment as it is seen from sideways, FIG. 6B shows the form of the present embodiment as it is seen from above it, and FIG. 6C shows a perspective view in which a portion of the reflecting member is enlarged and minute reflecting surfaces each are three-dimensionally angularly set and arranged, and provide a holographic plate at their limit. The reflecting member 13 can be placed perpendicularly to the optical axis of the eyeball. In that case, assuming that the reflecting member 13 is a female mold, if a transparent member corresponding to a male mold is joined therewith to make a plane parallel plate, there will be the merit that during transmission use, the scene by transmitted light is not distorted at all.

Figure 4:
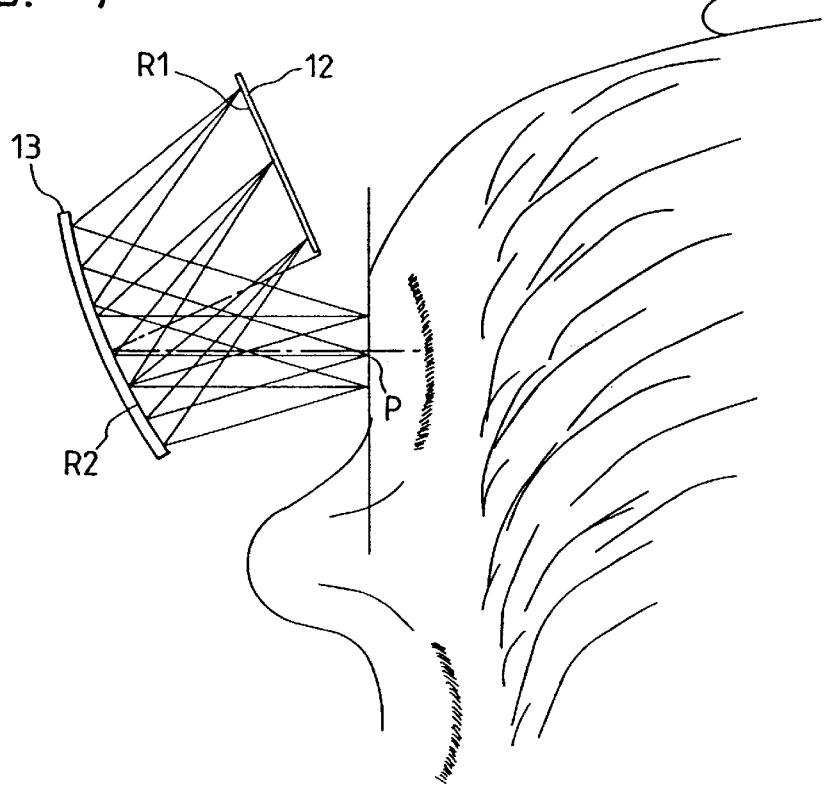
FIG. 4 is a plan view showing Embodiment 3 of the present invention.

The reflecting member 13 shown in FIGS. 3 and 4 and described above has its transmitting surface on the back of its reflecting surface adjacent to the eyeball side made into the same toric surface or toric aspherical shape, whereby the distortion of transmitted light is improved for the most part, and the aberrations of the reflecting optical system are good and the weight of the apparatus can be made lighter.

FIGS. 3, 4, 6A, 6B and 6C show a type in which the ray of light is horizontally bent by a reflecting member. FIG. 5 shows a type in which the ray of light is vertically bent by a reflecting member. The image formed by the reflecting optical system of the present embodiment is longer in the horizontal direction than in the vertical direction. That is, the image is of a rectangular shape in which the horizontal direction is longer sides and the vertical direction is shorter sides and therefore, in the type as shown in FIG. 5 wherein the ray of light is vertically bent, the ray of light is bent in the direction of the shorter sides which are small in the angle of field and thus, as compared with the horizontally bending type (FIGS. 3, 4, 6A, 6B and 6C) in which the ray of light is bent in the direction of the longer sides, the optical system itself can be made thin.

Also, there is the tendency that the creation of aberrations is greater in φ0 direction than in φ90 direction. In the horizontally bending type of FIGS. 3, 4, 6A, 6B and 6C, φ0 direction is the ray of light in the direction of the longer sides great in the angle of field, whereas in the vertically bending type of FIG. 5, φ0 direction is the ray of light in the direction of the shorter sides small in the angle of field and therefore, the vertically bending type is less in the creation of aberrations and can obtain a better performance.

The present invention can also be applied to the primary imaging prism type of head up display.

TABLE 1

Numerical Value Embodiment 1

| | radius of curvature (mm) | spacing (mm) | refractive index (nd) | Abbe number | |
|---|---|---|---|---|---|
| R1 | ∞ | 5.0 | | | |
| R2 | 16804.33 | 5.0 | 1.51633 | 64.15 | |
| R3 | 140.457 | 23.88 | | | |
| (toric aspherical surface) | | | | | |
| K = 0, B = 2.11374E−5, C = −8.33915E−8 | | | | | |
| 97.0315 (not shown, azimuth direction in a plane perpendicular to the cross-sectional view) | | | | | parallel-eccentric 4 mm |

TABLE 1-continued

| R4 88.41116 mirror |
|---|
| (toric aspherical surface) |
| K = 0, B = 7.36902E−7, C = −3.61139E−10 |
| 68.4073 (not shown, azimuth direction in a plane perpendicular to the cross-sectional view) |
| K = 0, B = 0, C = 0 |
| IP = 31 mm  θ = 50°  φ0/φ90 = 0.77 |
| E-i represents X10-i. |

} parallel-eccentric 3 mm

TABLE 2

Numerical Value Embodiment 2

| | radius of curvature (mm) | spacing (mm) | refractive index (nd) | Abbe number |
|---|---|---|---|---|
| R1 | ∞ | 32.18 | | |
| R2 | 80 | | mirror | |

(toric surface) 68 (not shown, azimuth direction in a plane perpendicular to the cross-sectional view)
IP=36 mm θ=50° φ0/φ90=0.81

TABLE 3

Numerical Value Embodiment 3

| | radius of curvature (mm) | spacing (mm) | refractive index (nd) | Abbe number |
|---|---|---|---|---|
| R1 | ∞ | 0.5 | | |
| R2 | −150 | 4.55 | 1.51633 | 64.15 |
| R3 | 200 | 25.0 | | |
| (toric aspherical surface) | | | | |
| K = −50, B = 1E−6, C = 0 | | | | |
| 100 (not shown, azimuth direction in a plane perpendicular to the cross-sectional view) | | | | |
| K = 0, B = 0, C = 0 | | | | |
| R4 | ∞ | 3.3 | 1.51633 | 64.15 |
| R5 | 200 | | 1.51633 (mirror) | 64.15 |

} parallel-eccentric 15 mm (toric surface) 110 (not shown, azimuth direction in a plane perpendicular to the cross-sectional view)
IP=16 mm θ=70° φ0/φ90=0.55

TABLE 4

Numerical Value Embodiment 2

| | radius of curvature (mm) | spacing (mm) | refractive index (nd) | Abbe number |
|---|---|---|---|---|
| R1 | ∞ | 32.08 | | |
| R2 | − | | | |

IP=31 mm θ=50° φ0/φ90=0.2
P2 is divided like meshes, and is equivalent to a reflecting surface of power of the focal length=42.5 mm in the direction of the top plan view and the focal length=34.0 mm in the direction of the side view. The three-dimensional angle of each surface is designated so that during reflection, the three-dimensional angle of the surface of each mesh may become small in aberration.

According to the above-described specific embodiments, there is the effect that a compact and light-weight apparatus can be realized and moreover, images of good quality can be observed. There is also derived the effect that the compactness and light weight of the apparatus decrease a sense of oppression even when the apparatus is mounted on a head or the like, and the degree of freedom of action is not spoiled.

What is claimed is:

1. An image display apparatus, comprising:
an image display device for displaying an image; and
an optical system for projecting an image formed by said image display device without forming an intermediate image and for leading the projected image to an observer's eyeball, said optical system including a concave mirror having a reflecting surface differing in power depending on the azimuth direction which is concave toward the observer's eyeball and an optical element of positive refractive power which is disposed between said concave mirror and said image display device,
wherein a direction of an optical axis incident on an observer's pupil is defined as a Z-axis direction, a Y-axis is defined so that decentration of said concave mirror is made in a YZ-plane, and an X-axis is defined so as to intersect both the Y- and Z-axes at right angles, and
wherein when an aspherical surface is defined by the following expression:

$$X = \frac{Z^2/r}{1 + \sqrt{1 - (K+1)(Z/r)^2}} + BZ^4 + CZ^6 + DZ^8$$

where r is a paraxial radius of curvature, said image display apparatus has the following properties:

| | radius of curvature (mm) | spacing (mm) | refractive index (nd) | Abbe number |
|---|---|---|---|---|
| R1 | ∞ | 5.0 | | |
| R2 | 16804.33 | 5.0 | 1.51633 | 64.15 |
| R3 | 140.457 | 23.88 | | |
| (toric aspherical surface) | | | | |
| K = 0, B = 2.11374E−5, C = −8.33915E−8 | | | | |
| 97.0315 (not shown, azimuth direction in a plane perpendicular to the cross-sectional view) | | | | |
| R4 | 88.41116 | | mirror | |
| (toric aspherical surface) | | | | |
| K = 0, B = 7.36902E−7, C = −3.61139E−10 | | | | |
| 68.4073 (not shown, azimuth direction in a plane perpendicular to the cross-sectional view) | | | | |
| K = 0, B = 0, C = 0 | | | | |
| IP = 31 mm  θ= 50°  φ0/φ90 = 0.77 | | | | |
| E-i represents X10' | | | | |

} parallel-eccentric 4 mm
} parallel-eccentric 3 mm wherein R1 corresponds to said image display device, R2 and R3 correspond to said optical element, and R4 corresponds to said concave mirror.

2. An apparatus according to claim 1, wherein said reflecting surface is a toric reflecting surface.

3. An apparatus according to claim 2, wherein said reflecting surface is inclined with respect to an optical axis.

4. An apparatus according to claim 1, wherein said reflecting surface is inclined with respect to an optical axis.

* * * * *

UNITED STATES PATENT AND TRADEMARK OFFICE
CERTIFICATE OF CORRECTION

PATENT NO. : 6,532,116 B1
DATED : March 11, 2003
INVENTOR(S) : Shoichi Yamazaki

It is certified that error appears in the above-identified patent and that said Letters Patent is hereby corrected as shown below:

Column 7,
Line 54, "Embodiment 2" should read -- Embodiment 4 --.

Column 8,
Line 54, "X10" should read -- $X10^{-i}$ --.

Signed and Sealed this

Thirtieth Day of December, 2003

JAMES E. ROGAN
*Director of the United States Patent and Trademark Office*